US012794696B2

(12) United States Patent
Lobban et al.

(10) Patent No.: US 12,794,696 B2
(45) Date of Patent: Nov. 10, 2026

(54) BLOCKCHAIN INTEGRATION SERVICES

(71) Applicant: JPMORGAN CHASE BANK, N.A., New York, NY (US)

(72) Inventors: Tyrone D Lobban, Loughton (GB); Keerthi Moudgal, Brooklyn, NY (US); Dennis Cristallo, New York, NY (US); Joe Leung, Reigate (GB); Stephanie Lok, New York, NY (US); Manmeet Ahluwalia, Tampa, FL (US); Chang Yang Jiao, New York, NY (US); Ganesh Anantwar, Mumbai (IN); . Shivjeet, Bengaluru (IN); Dwayne Richards, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/737,441

(22) Filed: Jun. 7, 2024

(65) Prior Publication Data

US 2025/0337578 A1 Oct. 30, 2025

(30) Foreign Application Priority Data

Apr. 25, 2024 (IN) ............................. 202411032857

(51) Int. Cl.
*H04L 9/32* (2006.01)
*H04L 9/00* (2022.01)

(52) U.S. Cl.
CPC .............. *H04L 9/3213* (2013.01); *H04L 9/50* (2022.05)

(58) Field of Classification Search
CPC ........ H04L 9/3213; H04L 9/3247; H04L 9/50
See application file for complete search history.

(56) References Cited

U.S. PATENT DOCUMENTS 11,522,703 B1 * 12/2022 Jain ........................ G16H 70/60
2021/0083873 A1 * 3/2021 Harris .................. H04L 9/3297

* cited by examiner

*Primary Examiner* — Olugbenga O Idowu
(74) *Attorney, Agent, or Firm* — GREENBERG TRAURIG LLP

(57) ABSTRACT

A method may include: an access management service receiving a client credential from a client; the access management service generating a bearer token for the client electronic device and communicating the bearer token to the client electronic device; a blockchain integration service receiving a remote procedure call with the bearer token from the client electronic device; the blockchain integration service validating the bearer token with the access management service; the blockchain integration service receiving, from the access management service, a client profile comprising the client credential; the blockchain integration service determining that the remote procedure call is a contract create call; the blockchain integration service submitting the contract create call to a blockchain network; and the blockchain integration service adding the client and/or the contract to an allow list, wherein the allow list identifies clients that are allowed to access the contract on the blockchain network.

12 Claims, 4 Drawing Sheets

BLOCKCHAIN INTEGRATION SERVICES

RELATED APPLICATIONS

This application claims the benefit of Indian Provisional Patent Application Ser. No. 202411032857, filed Apr. 25, 2024. The disclosure of this application is hereby incorporated, by reference, in its entirety.

BACKGROUND OF THE INVENTION

1. Field of the Invention

Embodiments generally relate to blockchain integration services.

2. Description of the Related Art

In general, if an actor has direct access to the nodes comprising a blockchain network, the actor can query the network's available data. This can create privacy concerns in the context of permissioned blockchain networks. At the same time, it may be desirable for third parties to interact with these nodes to deploy or interact with smart contracts on the network. Therefore, a solution is required to provide curated access to the network while protecting sensitive data.

SUMMARY OF THE INVENTION

Blockchain integration services are disclosed. According to an embodiment, a method may include: (1) receiving, by an access management service executed by an electronic device, a client credential from a client electronic device for a client; (2) generating, by the access management service, a bearer token for the client electronic device; (3) communicating, by the access management service, the bearer token to the client electronic device; (4) receiving, at a blockchain integration service, a remote procedure call with the bearer token from the client electronic device; (5) validating, by the blockchain integration service, the bearer token with the access management service; (6) receiving, by the blockchain integration service and from the access management service, a client profile comprising the client credential; (7) determining, by the blockchain integration service, that the remote procedure call is a contract create remote procedure call for a contract; (8) submitting, by the blockchain integration service, the contract create call to a blockchain network, wherein the blockchain network may be configured to deploy the contract; and (9) adding, by the blockchain integration service, the client and/or the contract to an allow list, wherein the allow list identifies clients that are allowed to access the contract on the blockchain network.

In one embodiment, the client credential may include a digital identifier for the client.

In one embodiment, the client credential may include a verifiable credential for the client.

In one embodiment, the bearer token may be mapped to the client credential.

In one embodiment, the remote procedure call may be signed with the bearer token.

In one embodiment, the access management service validates the bearer token by verifying that the bearer token is active and is associated with the client that submitted the remote procedure call.

According to another embodiment, a method may include: receiving, by an access management service executed by an electronic device, a client credential from a client electronic device for a client; (2) generating, by the access management service, a bearer token for the client electronic device; (3) communicating, by the access management service, the bearer token to the client electronic device; (4) receiving, at a blockchain integration service, a remote procedure call with the bearer token from the client electronic device; (5) validating, by the blockchain integration service, the bearer token with the access management service; (6) receiving, by the blockchain integration service and from the access management service, a client profile comprising the client credential; (7) determining, by the blockchain integration service, that the remote procedure call is other than a contract create remote procedure call; (8) determining, by the blockchain integration service, that the client or a contract associated with the remote procedure call is on an allow list, wherein the allow list identifies clients that are allowed to access the contract on a blockchain network; and (9) submitting, by the blockchain integration service, the remote procedure call to a blockchain network, wherein the blockchain network may be configured to execute the remote procedure call.

In one embodiment, the client credential may include a digital identifier for the client.

In one embodiment, the client credential may include a verifiable credential for the client.

In one embodiment, the bearer token may be mapped to the client credential.

In one embodiment, the remote procedure call may be signed with the bearer token.

In one embodiment, the access management service validates the bearer token by verifying that the bearer token is active and is associated with the client that submitted the remote procedure call.

According to another embodiment, a method may include: (1) receiving, by an access management service executed by an electronic device, a client credential from a client electronic device for a client; (2) generating, by the access management service, a bearer token for the client electronic device; (3) communicating, by the access management service, the bearer token to the client electronic device; (4) receiving, at a blockchain integration service, a call with the bearer token from the client electronic device; (5) validating, by the blockchain integration service, the bearer token with the access management service; (6) checking, by the blockchain integration service, that the client and a contract address are on an allow list; (7) calculating, by the blockchain integration service, a calculated contract address from a transaction hash; (8) comparing, by the blockchain integration service, the calculated contract address to the contract address; and (9) adding, by the blockchain integration service, the contract address to the allow list in response to the calculated contract address matching the contract address such that the client can address the contract at the contract address.

In one embodiment, the client credential may include a digital identifier for the client.

In one embodiment, the client credential may include a verifiable credential for the client.

In one embodiment, the bearer token may be mapped to the client credential.

In one embodiment, the call may be signed with the bearer token.

In one embodiment, the access management service validates the bearer token by verifying that the bearer token is active and is associated with the client that submitted the call.

In one embodiment, the call may be a contracts call.

In one embodiment, the calculated contract address may be calculated by deriving the calculated contract address from the transaction hash using blockchain metadata and a cryptographic library.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to blockchain integration services and methods of use.

In embodiments, the blockchain integration service may determine, from a signed raw transaction, whether a client can interact with a certain contract at an address. For example, if a malicious client attempts to sign a raw transaction, but then swaps out the raw transaction body, the blockchain integration service return an address that is not owned by the client or that is not permissioned to be interacted with by the client, which will trigger an error.

If an improper raw transaction is signed, it will trigger an error from the blockchain network itself.

Figure 1:
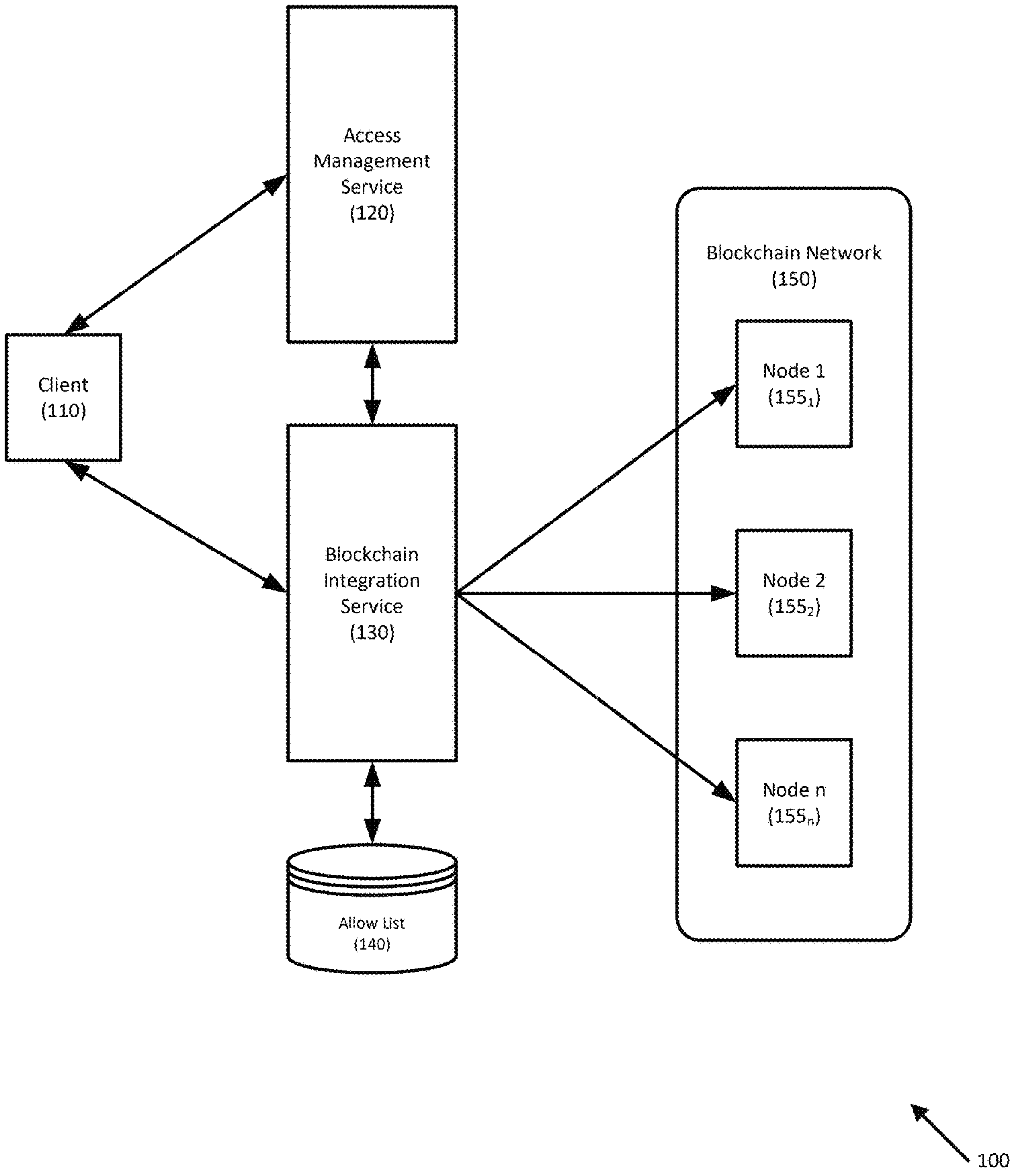
FIG. 1 depicts a blockchain integration service according to an embodiment.

Referring to FIG. 1, a blockchain integration service is disclosed according to an embodiment. System 100 may include client 110, which may be a client electronic device, a client system, etc. Client 110 may interface with access management service 120 which may onboard client 110 and verify the identity and/or entitlements for client 110.

In one embodiment, access management service 120 may be a digital identity system and client 110 may provide a digital identity and/or verifiable credential to access management service 120. Examples of digital identities and verifiable credentials are disclosed in U.S. patent application Ser. No. 18/342,450, filed Jun. 27, 2023, U.S. Provisional Patent Application Ser. No. 63/367,115, filed Jun. 27, 2022, U.S. Provisional Patent Application Ser. No. 63/357,511, filed Jun. 30, 2022, and U.S. Provisional Patent Application Ser. No. 63/373,814, filed Aug. 29, 2022, U.S. Provisional Patent Application Ser. No. 63/126,335, filed Dec. 16, 2020, U.S. Provisional Patent Application Ser. No. 62/976,262, filed Feb. 13, 2020, and U.S. patent application Ser. No. 17/174,650, filed Feb. 12, 2021, the disclosures of which are hereby incorporated, by reference, in their entireties.

Access management service 120 may issue a bearer token to client 110 once client 110 is onboarded. Bearer token may be a unique identifier that may be mapped to client 110. In one embodiment, the bearer token may be mapped to a client address for client 110, such as a distributed ledger address.

System 100 may further include blockchain integration service 130. Blockchain integration service 130 may receive the bearer token from client 110 and may verify the bearer token with access management service 120. Blockchain integration service 130 may further verify that client 110, the client call, and/or an address for the client is on allow list 140.

In one embodiment, blockchain integration service 130 may add client 110 to allow list 140 in response to an action by blockchain network 150 which may verify that client 110 is authorized to perform the desired interaction with blockchain network 150.

Blockchain network 150 may include a plurality of nodes, such as node 1 $\mathbf{155}_1$, node 2 $\mathbf{155}_2$, . . . node n $\mathbf{155}_n$. Blockchain network 150 may be any suitable sort of consensus-based blockchain network.

Figure 2A:
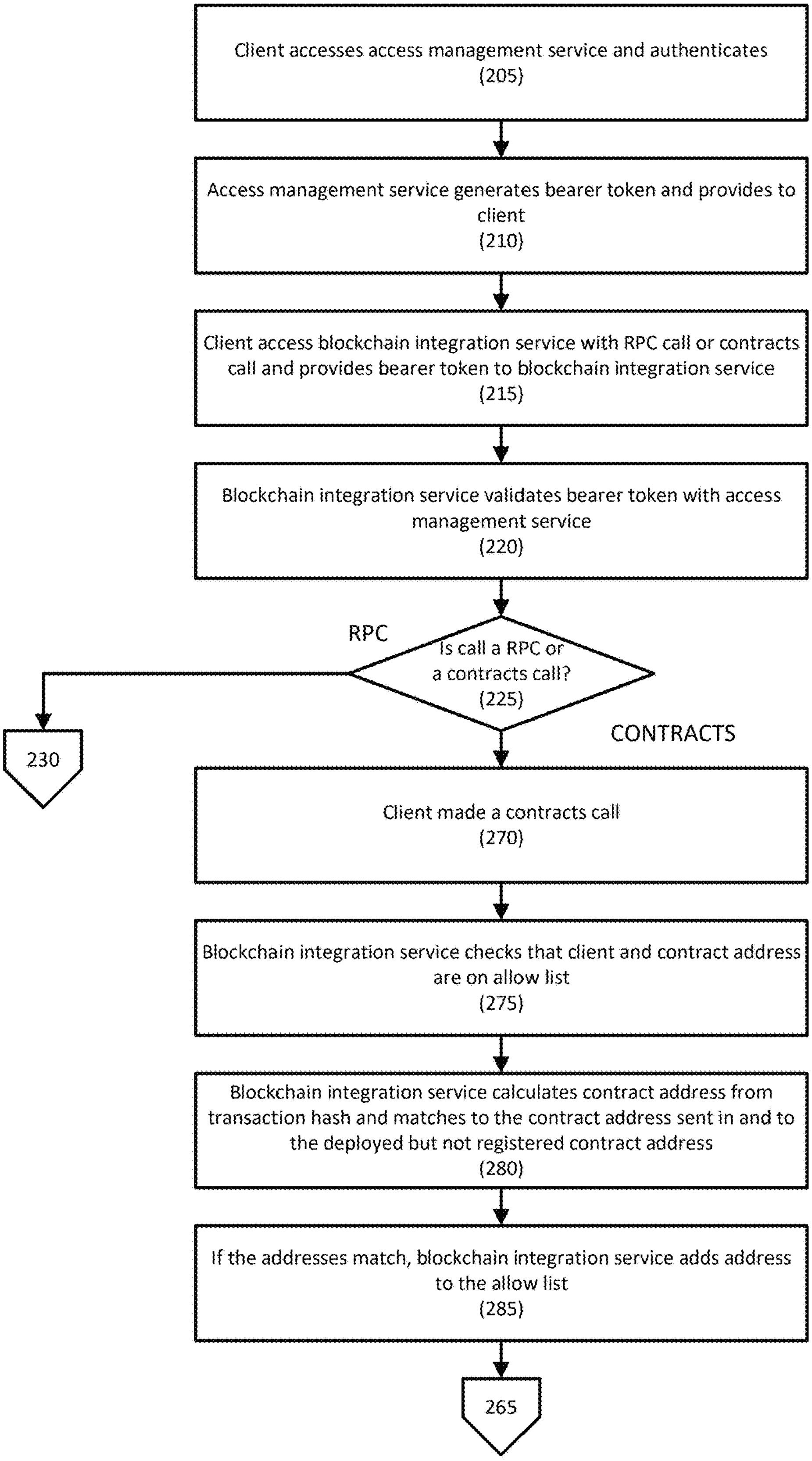
FIGS. 2A and 2B depict a method for using a blockchain integration service according to an embodiment.
Figure 2B:
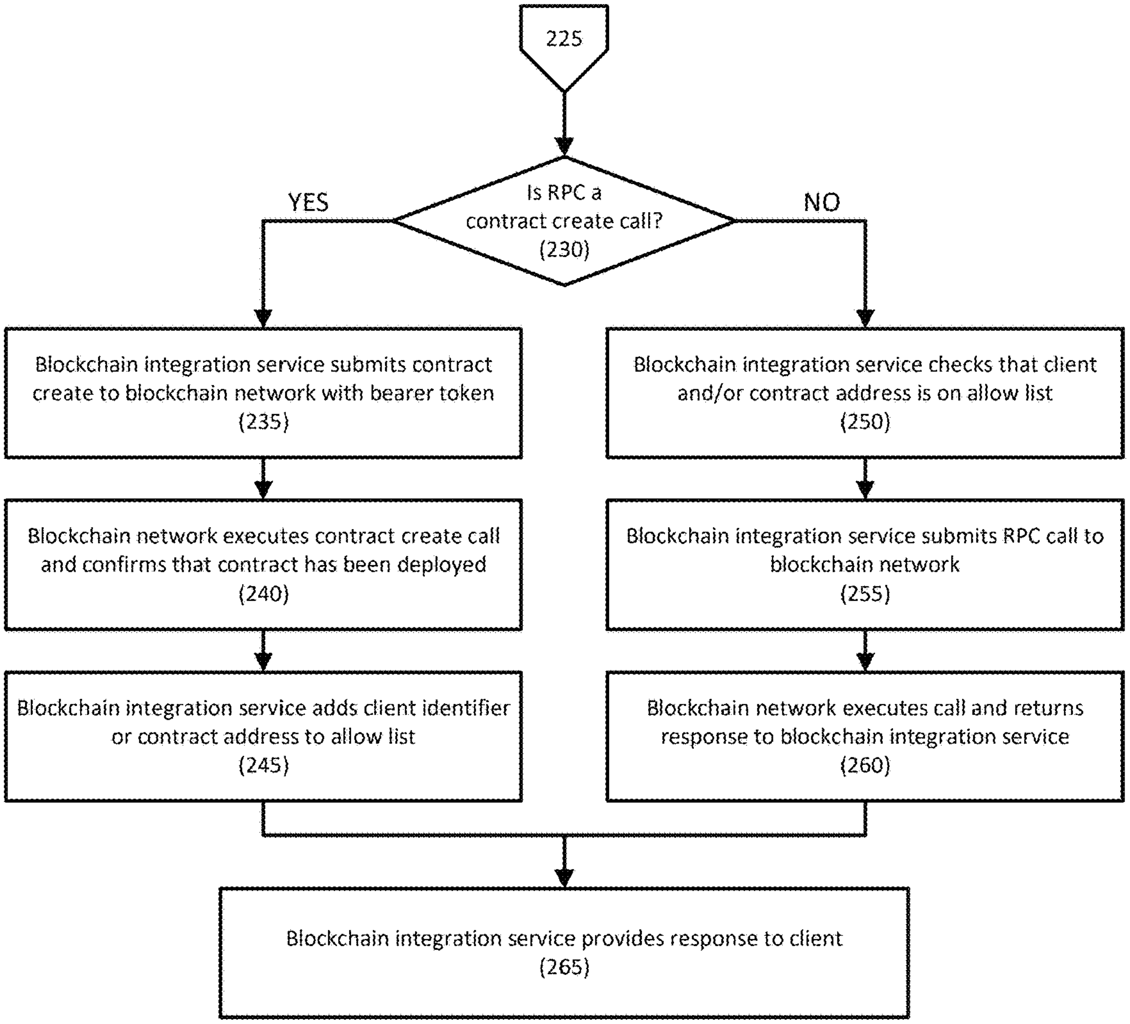

Referring to FIGS. 2A and 2B, a method of using blockchain integration services 130 is disclosed according to an embodiment.

In step 205, a client computer program executed by a client electronic device may access an access management service. In one embodiment, the client electronic device may register or onboard with the access management service by providing a client credential, such as client identity information. For example, the client electronic device may provide a digital identifier, a verifiable credential, a client identifier, etc.

The access management service may validate the client credential and authenticate the client.

In step 210, the access management service may generate a bearer token and may provide the bearer token to the client electronic device. In one embodiment, the bearer token may be a unique identifier that may be mapped to the client.

In step 215, the client computer program may access the blockchain integration service on a Remote Procedure Call (RPC) endpoint or a contracts endpoint and may provide the bearer token to blockchain integration service. In one embodiment, the client computer program may sign the call with the bearer token.

In one embodiment, the call may be received via an exposed application programming interface (API).

In step 220, the blockchain integration service may validate the bearer token with access management service. In one embodiment, the blockchain integration service may verify that the bearer token is active and associated with the client program that is submitting the call.

In one embodiment, the access management service may respond with a client profile that may include authorization, a client identifier, etc.

In step 225, the blockchain integration service may determine whether the call is a RPC call or a contracts call. If the call is a RPC call, in step 230, the blockchain integration service may determine whether the call is for a contract create. If it is, in step 235, the blockchain integration service may submit the contract create call to the blockchain network with the bearer token.

In step 240, the blockchain network may execute the contract create. For example, the blockchain network may submit a signed transaction that contains contract byte code and then can be read/understood as a contract itself at a contract address. The blockchain network may then return a response to the blockchain integration service confirming that the contract has been deployed.

In step 245, the blockchain integration service may add the client identifier and/or the contract address to the allow list. In one embodiment, the blockchain integration service may add the client identifier and/or the address to the allow list.

If, in step 230, the RPC is not a contract create call, in step 250, the blockchain integration service may check to see if the client and/or contract address are on the allow list. If they are, in step 255, the blockchain integration service may submit the call to the blockchain network for execution.

Other examples of RPC call may include, for example, blockNumber, getBalance, sendTransaction, etc.

If the client and/or the contract are not on the allow list, the call may be denied.

In step 260, the blockchain network may execute the call and may return a response to the blockchain integration service. The response may be based on the type of call, and may include, for example, success, error (with error messaging), the requested data, etc.

In step 265, the blockchain integration service may return the response to the client.

In step 225, if the call is a contracts call, in step 270, the blockchain integration service may determine that the call is for registering a contract.

In one embodiment, the call may include a transaction hash

In step 275, the blockchain integration service may check that the client and the contract address are on the allow list. If they are, in step 280, the blockchain integration service may calculate the contract address from the transaction hash received from the client and may match the calculated contract address with the contract address that the client passed in and the contract address that has been deployed on the blockchain network but not registered on the allow list.

For example, the blockchain integration service may derive parameters or inputs from the client call, and then the calculated contract address may be derived from the transaction hash using these parameters. Examples of parameters or inputs may include the parent contract address, the nonce, a random string value, a bytecode, a child contract address, etc.

In step 285, if the addresses match, the blockchain integration service may add the contract address to the allow list so that the client may interact with the contract address.

The process may then continue to step 265.

Figure 3:
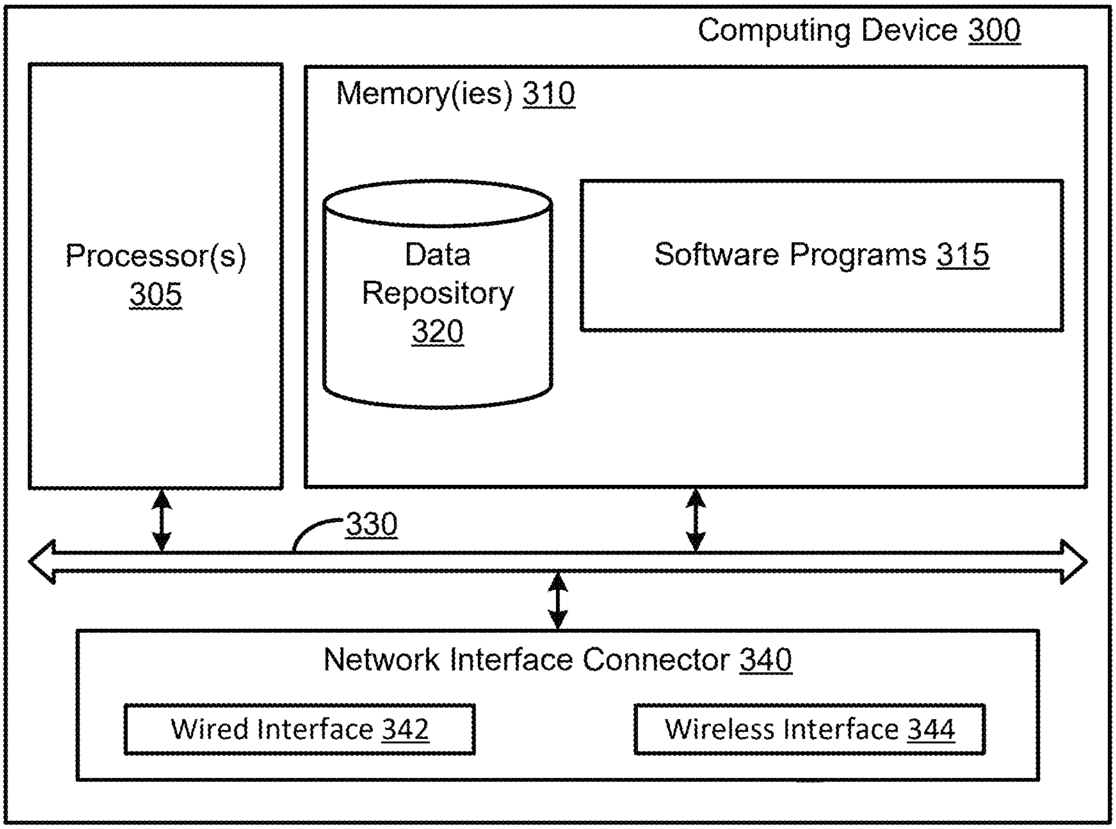
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by an access management service executed by an electronic device, a client credential from a client electronic device for a client;

generating, by the access management service, a bearer token for the client electronic device;

communicating, by the access management service, the bearer token to the client electronic device;

receiving, at a blockchain integration service that controls access to a blockchain network, a remote procedure call with the bearer token from the client electronic device;

validating, by the blockchain integration service, the bearer token with the access management service;

receiving, by the blockchain integration service and from the access management service, a client profile comprising the client credential;

determining, by the blockchain integration service, that the remote procedure call is other than a contract create remote procedure call;

determining, by the blockchain integration service, that the client or a contract associated with the remote procedure call is on an allow list, wherein the allow list identifies clients that are allowed to access the contract on the blockchain network; and submitting, by the blockchain integration service, the remote procedure call to a blockchain network, wherein the blockchain network is configured to execute the remote procedure call.

2. The method of claim 1, wherein the client credential comprises a digital identifier for the client.

3. The method of claim 1, wherein the client credential comprises a verifiable credential for the client.

4. The method of claim 1, wherein the bearer token is mapped to the client credential.

5. The method of claim 1, wherein the remote procedure call is signed with the bearer token.

6. The method of claim 1, wherein the access management service validates the bearer token by verifying that the bearer token is active and is associated with the client that submitted the remote procedure call.

7. A system, comprising:

a client electronic device for a client executing a client computer program;

an access management service executed by an electronic device;

a blockchain network; and a blockchain integration service that controls access to the blockchain network;

wherein:

the access management service is configured to receive a client credential from the client computer program;

the access management service is configured to generate a bearer token for the client electronic device;

the access management service is configured to communicate the bearer token to the client computer program;

the blockchain integration service is configured to receive a remote procedure call with the bearer token from the client electronic device;

the blockchain integration service is configured to validate the bearer token with the access management service;

the blockchain integration service is configured to receive, from the access management service, a client profile comprising the client credential;

the blockchain integration service is configured to determine that the remote procedure call is other than a contract create remote procedure call;

the blockchain integration service is configured to determine that the client or a contract associated with the remote procedure call is on an allow list, wherein the allow list identifies clients that are allowed to access the contract on the blockchain network;

the blockchain integration service is configured to submit the remote procedure call to a blockchain network; and the blockchain network is configured to execute the remote procedure call.

8. The system of claim 7, wherein the client credential comprises a digital identifier for the client.

9. The system of claim 7, wherein the client credential comprises a verifiable credential for the client.

10. The system of claim 7, wherein the bearer token is mapped to the client credential.

11. The system of claim 7, wherein the remote procedure call is signed with the bearer token.

12. The system of claim 8, wherein the access management service is configured to validate the bearer token by verifying that the bearer token is active and is associated with the client that submitted the remote procedure call.

* * * * *